United States Patent Office 3,542,997
Patented Nov. 24, 1970

3,542,997
NON-SHIELDED ARC WELDING
Takuro Kobayashi, Sendai-shi, Japan, assignor to Nippon Kokan Kabushiki Kaisha, a corporation of Japan
No Drawing. Filed Dec. 12, 1967, Ser. No. 689,806
Claims priority, application Japan, Dec. 14, 1966, 41/81,642
Int. Cl. B23k *35/00*
U.S. Cl. 219—145     3 Claims

ABSTRACT OF THE DISCLOSURE

An improvement relating to method and electrode for non-shielded arc welding making possible to perform under an atmosphere without any pore and crater by using said electrode alloying with one or more of special elements like Ti, Zr, Nb, Ta, Va, V, and Ce are made to include in 0.03% and more, and making aluminium larger form on the surface of said electrode.

---

The present invention relates to a non-shielded arc welding method of steel, that is, a method of welding steel under an air atmosphere without using flux or shielded gas.

The inventor has already obtained the patent for electrode wires including certain elements like Ti, Zr and others to be used for non-shielded arc welding (U.S. Pat. No. 3,249,736; U.K. Pat. No. 1,046,259). In this method, by using electrode wires including 0.25%–2% of Ti and Zr altogether, non-porous and sound deposits are available. Electrode wires for non-shielded arc welding according to this method has already put to practical use, though in a small quantity.

However, steel rods or wires for a consumable electrode developed so far have the biggest disadvantage that they cannot be used at higher welding current. For example, when using said electrode wires (bare solid wires) for non-shielded arc welding now available, having a diameter of 1.6 mm., the welding current is limited to less than about 240 a. (Submitted to the commission No. XII the 1965 Annual Assembly of the International Institute of Welding in Paris—Takero Kobayashi; "Non-Shielded Arc Welding of Steel" IIW Document XII 264–65) Welding at higher current produces pores which prevent the products from being put to practical use.

In recent years, the industries need higher welding current, more than 400 a., for electrode wires with a diameter of 1.6 mm. with an object of attaining higher efficiency. But, it is entirely impossible to satisfy this requirement by a consumable bare solid wire for non-shielded arc welding.

The present invention has successfully solved this difficult problem. This is, by this invention, the non-shielded arc welding with healthy deposits can be carried out within a wider range of welding current, by using a consumable solid wire alloyed with a small amount of elements having strong chemical affinity to oxygen and nitrogen such as Ti, Zr, Nb, Ta, V, Ce and others and made to form a thin coated layer of aluminium or aluminium alloy.

In some of more recent inventions, the whole surface of bare wires is made to form a thin coated layer of aluminium or aluminium alloy as a core wire for $CO_2$-shielded welding. (For example, Japan Patent Publication No. 18,323/1959). However, as apparent from said Patent Publication, the main object of coating the surface of said wires with aluminium is to control the sputtering during welding which is characteristic of $CO_2$ welding. Secondary objects are de-oxidation effect by aluminium or aluminium alloy; rust-proof measures for core wire and preventive measures for various welding defects due to oxygen. But no special attention is paid to nitrogen under an air atmosphere.

The other features and objects of the present invention will be better understood from the following detailed description.

According to the present invention, it is intended that oxygen and nitrogen should be prevented from being absorbed into the globule formed at the tip of a steel rod or wire for a consumable electrode, first by aluminium coating on its surface. Even if oxygen and nitrogen are still more absorbed in spite of said coating, their bad effects can be eliminated by the action of special elements (Ti, Zr, Nb, V, Ta, Ce and others) made to include in the steel wire, so that effective non-shielded arc welding can be carried out even at a higher welding current.

In order to study the soundness of various deposits, X-ray inspection was made, by welding mild steel of 12 mm. in thickness in the air into 11 kinds of bare steel wires as a consumable electrode (with a diameter of 1.6 mm.) listed in Table 1 and also into ones coated with aluminium (which is about 1/100 mm. and corresponds to about 0.8% of steel wires' weight). The welding was carried out with a fully automatic welding machine using direct current source that is kept to constant-voltage and rectified by selenium and at the rate of deposition of 30 cm./min. with reverse polarity.

Table 2 shows the results of said X-ray inspection. As apparent from the Table, except wires B and K, they show JIS (the Japan Industrial Standard) grade 6 because of high porosity when the welding current exceeds over 250 a. Wires B and K, the conventional electrode wires for non-shielded arc welding, if not coated with aluminium, show grade 4 in being welded at 250 a., but deteriorate to grade 6 at 450 a. On the other hand, if coated with aluminium, they show grade 1–3 even at 450 a., so that the deposits are quite sound and satisfactory enough to be put into practical use.

TABLE 1.—CHEMICAL COMPOSITION OF USED WIRES

| Wire mark | Weight/Percent | | | | | | | | |
|---|---|---|---|---|---|---|---|---|---|
| | C | Mn | Si | P | S | Ti | Zr | Others | Fe |
| A | 0.08 | 0.42 | 0.02 | 0.018 | 0.020 | | | | Residual. |
| B | 0.09 | 1.22 | 0.35 | 0.019 | 0.021 | 0.11 | 0.20 | | Do. |
| C | 0.10 | 0.98 | 0.25 | 0.016 | 0.020 | 0.04 | | | Do. |
| D | 0.08 | 0.95 | 0.30 | 0.020 | 0.022 | 0.12 | | | Do. |
| E | 0.10 | 1.03 | 0.35 | 0.016 | 0.018 | 0.46 | | | Do. |
| F | 0.07 | 1.31 | 0.30 | 0.021 | 0.023 | | 0.07 | | Do. |
| G | 0.10 | 0.98 | 0.25 | 0.017 | 0.021 | | 0.15 | | Do. |
| H | 0.10 | 0.97 | 0.24 | 0.019 | 0.020 | 0.06 | | Nb, 0.05 | Do. |
| I | 0.11 | 1.33 | 0.48 | 0.018 | 0.020 | 0.13 | | V, 0.06 | Do. |
| J | 0.08 | 1.11 | 0.32 | 0.020 | 0.021 | | 0.10 | Ta, 0.05 | Do. |
| K | 0.10 | 1.15 | 0.44 | 0.019 | 0.022 | 0.11 | 0.15 | Ce, 0.02 | Do. |

TABLE 2.—RESULTS OF X-RAY INSPECTION OF THE DEPOSITS

| Wire mark | Aluminum coated layer | Grade 22v., 200 a. | Grade 26v., 250 a. | Grade 38v., 450 a. |
|---|---|---|---|---|
| A | Noncoated | JIS 6 | JIS 6 | JIS 6. |
|   | Coated | JIS 5 | JIS 5 | JIS 5. |
| B | Noncoated | JIS 2 | JIS 4 | JIS 6. |
|   | Coated | JIS 1 | JIS 1 | JIS 2. |
| C | Noncoated | JIS 5 | JIS 6 | JIS 6. |
|   | Coated | JIS 3 | JIS 3 | JIS 3. |
| D | Noncoated | JIS 5 | JIS 6 | JIS 6. |
|   | Coated | JIS 2 | JIS 2 | JIS 2. |
| E | Noncoated | JIS 5 | JIS 6 | JIS 6. |
|   | Coated | JIS 2 | JIS 2 | JIS 2. |
| F | Noncoated | JIS 5 | JIS 6 | JIS 6. |
|   | Coated | JIS 3 | JIS 3 | JIS 3. |
| G | Noncoated | JIS 5 | JIS 6 | JIS 6. |
|   | Coated | JIS 2 | JIS 2 | JIS 2. |
| H | Noncoated | JIS 6 | JIS 6 | JIS 6. |
|   | Coated | JIS 2 | JIS 2 | JIS 2. |
| I | Noncoated | JIS 5 | JIS 6 | JIS 6. |
|   | Coated | JIS 2 | JIS 2 | JIS 2. |
| J | Noncoated | JIS 5 | JIS 6 | JIS 6. |
|   | Coated | JIS 2 | JIS 2 | JIS 2. |
| K | Noncoated | JIS 2 | JIS 4 | JIS 6. |
|   | Coated | JIS 1 | JIS 1 | JIS 1. |

Wire A, not including certain elements such as Ti and Zr at all, shows JIS grade 5, although the production of pores considerably decreases if coated with aluminium. Therefore, it cannot be practically used.

Wires B-K includes about 0.04%–0.46% of one or more special elements such as Ti, Zr, Nb, V, Ta and Ce. (When including more than one element, the percentage refers to total amount of the elements which is included.) Accordingly, it will be understood that if electrode wires with a small amount of special elements are coated with aluminium, non-shielded arc welding has become possible even at higher welding current owing to remarkable good effect of aluminium.

Besides said experiment by coating industrial pure aluminium on the surface of steel wires, a similar experiment was carried out by coating wire B with aluminium alloys including Mn, Si, Ti, Zr, Fe, Mg and Cr, from which favorable results were gained, too.

Experiment was also made on wire B to survey the relation between the thickness of aluminium coating and effects gained. As a result, it was confirmed that some effect was already obtained by making an Al-coating layer not so much as 3/1000 mm. in thickness on the surface of a steel rod or wire having a diameter of 1.6 mm., but that a thickness over 1/10 mm. was not proper because the aluminium content in the welding metal was excessive.

As apparent from said description, the present invention has successfully removed the biggest obstacle in developing a non-shielded arc welding method, by making possible non-shielded arc welding in a wider range of said current, using steel rods or wires including a small amount of said special elements and thin coating with aluminium or aluminium alloy on thin surface as a consumable electrode from which it is considered that the present invention has a great industrial significance.

With high welding current employed, both deposition efficiency and penetration depth are improved so remarkably that this welding method could be enlarged to other ranges and fields.

Further, in the prior art, if the conventional electrode wires for non-shielded arc welding are used as bare, the rate of operation was limited to about 50 cm./min., because, at higher rates, the deposit become porous even at low current. On the other, it was found that with said wires coated with aluminium, sound deposits can be obtained even at about 150 cm./min. Therefore, the present invention has succeeded in welding at high rate of operation.

It is also well-known in the art that there was no suitable remedy to prevent deep craters produced at the end of the weld line when using the conventional electrode wires for non-shielded arc welding in the naked form. But according to the present invention, electrode wires coated with aluminium produce no crater pits at all even at high welding current. This advantage, though subsidiary, has industrially important significance.

In addition, it should be noted that if total amount of special elements including Ti, Zr, Nb, Ta and Ce is less than 0.03%, the expected effect in the present invention cannot be realized; even if more than 0.5% of special elements is added, the effect cannot be correspondingly improved. Therefore, though there is no harm in adding more than 0.5%, it is economically undesirable as core wire for welding of mild steel.

There are many aluminium coating process such as hot-deep aluminizing, vapourizing, spraying, diffusion and the like, but their effect is quite the same.

In sum, according to the present invention, non-shielded arc welding has become possible in a wider range of said current, by coating aluminium or aluminium alloy on the surface of steel rods or wires including a small quantity of said special elements compared with that of the conventional steel rods or wires for non-shielded arc welding.

The present invention has also succeeded in expanding the range of welding current employed to higher levels, by coating aluminium or aluminium alloy on the surface of steel rods or wires including the same amount of special elements as the conventional rods or wires for non-shielded arc welding.

Further, the present invention has also overcome almost all the major obstacles of the conventional non-shielded arc welding, for example, high-speed weldability and preventing the possibility of craters or pores developing.

The present invention will be sure to contribute to the rapid progress in the non-shielded arc welding.

Although I have described our invention hereinabove in considerable detail, I do not wish to be limited narrowly, but I may also use such substitutes, modifications or equivalents as are included within the scope and spirit of the invention or pointed out in the appended claims.

What I claim is:

1. In a non-shielded arc welding method wherein an electric arc is maintained from the work to a consumable electrode, the improvement which comprises an electrode consisting of a steel rod or wire consisting of 0.07–0.11% carbon, 0.95–1.33% manganese, 0.24–0.48% silicon, 0.16–0.21%. phosphorus, 0.018–0.023% sulfur, at least 0.03–0.5 percent by weight of one or more of an element selected from the group consisting of titanium, zirconium, niobium, tantalum, vanadium and cerium, and the balance iron, and having an aluminum or aluminum alloy layer on the surface thereof.

2. An electrode rod or wire consisting of a steel rod or wire consisting of 0.07–0.11% carbon, 0.95–1.33% manganese, 0.24–0.48% silicon, 0.16–0.21% phosphorus, 0.018–0.023% sulfur, 0.03–0.5 percent by weight of one or more of an element selected from the group consisting of titanium, zirconium, niobium, tantalum, vanadium and cerium, and the balance iron, and having an aluminum or aluminum alloy layer on the surface thereof.

3. An electrode rod or wire of claim 2 wherein the thickness of the aluminum layer is from 0.003 mm. to 0.1 mm.

References Cited

UNITED STATES PATENTS

| 2,248,279 | 7/1941 | Agostino | 219—145 |
| 3,059,093 | 10/1962 | Norcross et al. | 219—145 |
| 1,942,364 | 1/1934 | Rood | 219—146 |
| 3,218,432 | 11/1965 | Peck | 219—145 |

JOSEPH V. TRUHE, Primary Examiner

L. A. ROUSE, Assistant Examiner